(12) United States Patent
Fux et al.

(10) Patent No.: US 9,092,418 B2
(45) Date of Patent: Jul. 28, 2015

(54) USE OF A SUFFIX-CHANGING SPELL CHECK ALGORITHM FOR A SPELL CHECK FUNCTION, AND ASSOCIATED HANDHELD ELECTRONIC DEVICE

(75) Inventors: Vadim Fux, Waterloo (CA); Shannon Ralph White, Waterloo (CA)

(73) Assignee: BlackBerry Limted, Waterloo, Ontario (CA)

( * ) Notice: Subject to any disclaimer, the term of this patent is extended or adjusted under 35 U.S.C. 154(b) by 2029 days.

(21) Appl. No.: 11/694,384

(22) Filed: Mar. 30, 2007

(65) Prior Publication Data

US 2008/0244389 A1    Oct. 2, 2008

(51) Int. Cl.
 *G06F 17/27* (2006.01)

(52) U.S. Cl.
 CPC ................... *G06F 17/273* (2013.01)

(58) Field of Classification Search
 CPC ..................................... G06F 17/273
 USPC .......................................... 715/257
 See application file for complete search history.

(56) References Cited

U.S. PATENT DOCUMENTS

| | | | | |
|---|---|---|---|---|
| 5,924,059 A * | 7/1999 | Kawanabe | | 704/10 |
| 5,952,942 A | 9/1999 | Balakrishnan et al. | | |
| 6,307,548 B1 | 10/2001 | Flinchem et al. | | |
| 7,453,439 B1 * | 11/2008 | Kushler et al. | | 345/168 |
| 7,580,829 B2 * | 8/2009 | James et al. | | 704/2 |
| 2002/0194229 A1 * | 12/2002 | Decime et al. | | 707/533 |
| 2003/0011574 A1 * | 1/2003 | Goodman | | 345/172 |
| 2005/0198023 A1 | 9/2005 | James et al. | | |
| 2006/0290535 A1 * | 12/2006 | Thiesson et al. | | 341/22 |

FOREIGN PATENT DOCUMENTS

| | | |
|---|---|---|
| EP | 1 752 862 A1 | 2/2007 |
| EP | 1 843 255 A1 | 10/2007 |
| EP | 1 050 794 A2 | 11/2008 |

OTHER PUBLICATIONS

Church, et al., "The Wild Thing!", Proceedings of the ACL Interactive Poster and Demonstration Sessions, pp. 93-96, Ann Arbor, Jun. 2005, Association for Computational Linguistics.*
"Handheld Desk dictionary Fourth Edition Operation Manual", Spellex, retrieved from Internet Archive Wayback Machine, http://web.archive.org, http://www.spellex.com, Mar. 13, 2006, p. 1-52.*
Kukich, Karen, "Techniques for Automatically Correcting Words in Text," ACM Computing Surveys, vol. 24, No. 4, Dec. 1992.
Extended European Search Report issued in European Application No. 07105401.9 on Aug. 23, 2007; 6 pages.
Communication Pursuant to Article 94(3) EPC issued in European Application No. 07105401.9 on Apr. 7, 2009; 2 pages.
Communication Pursuant to Article 94(3) EPC issued in European Application No. 07105401.9 on May 29, 2009; 3 pages.

(Continued)

*Primary Examiner* — Amelia Tapp
(74) *Attorney, Agent, or Firm* — Fish & Richardson P.C.

(57) ABSTRACT

An improved spell check function and handheld electronic device provide a spell checking feature that includes a spell check algorithm that changes a suffix of a text entry by replacing each of one or more terminal characters thereof with a wild card element which can be any character or an absence of a character. A memory on the handheld electronic device has a plurality of language objects which are searched to identify language objects which correspond with the modified text entry with the terminal wild card element(s).

12 Claims, 7 Drawing Sheets

(56) References Cited

OTHER PUBLICATIONS

Communication Pursuant to Article 94(3) EPC issued in European Application No. 07105401.9 on Jan. 11, 2010; 3 pages.
Invitation Pursuant to Article 94(3) EPC and Rule 71(1) EPC issued in European Application No. 07105401.9 on Aug. 23, 1010; 3 pages.
Communication under Rule 71(3) EPC issued in European Application No. 07105401.9 on Oct. 15, 2010; 43 pages.
Extended European Application No. 07105406.8 on Aug. 23, 2007; 6 pages.
Communication Pursuant to Article 94(3) EPC issued in European Application No. 07105406.8 on May 28, 2009; 4 pages.
Communication Pursuant to Article 94(3) EPC issued in European Application No. 07105406.8 on Nov. 26, 2009; 4 pages.
Communication Pursuant to Article 94(3) EPC issued in European Application No. 07105406.8 on Apr. 15, 2010; 5 pages.
Invitation Pursuant to Article 94(3) EPC and Rule 71(1) EPC issued in European Application No. 07105406.8 on Aug. 23, 2010; 3 pages.
Communication under Rule 71(3) EPC issued in European Application No. 07105406.8 on Oct. 15, 2010; 44 pages.
Office Action issued in U.S. Appl. No. 11/694,295 on Jul. 7, 2010; 12 pages.
Office Action issued in U.S. Appl. No. 11/694,295 on Feb. 17, 2011; 12 pages.
Advisory Action issued in U.S. Appl. No. 11/694,295 on Apr. 21, 2011; 3 pages.
Office Action issued in U.S. Appl. No. 11/694,295 on Jun. 14, 2011; 12 pages.
Office Action issued in U.S. Appl. No. 11/694,295 on Nov. 2, 2011; 13 pages.
Advisory Action issued in U.S. Appl. No. 11/694,295 on Jan. 12, 2012; 3 pages.
Office Action issued in U.S. Appl. No. 11/694,295 on Oct. 2, 2014; 13 pages.

\* cited by examiner

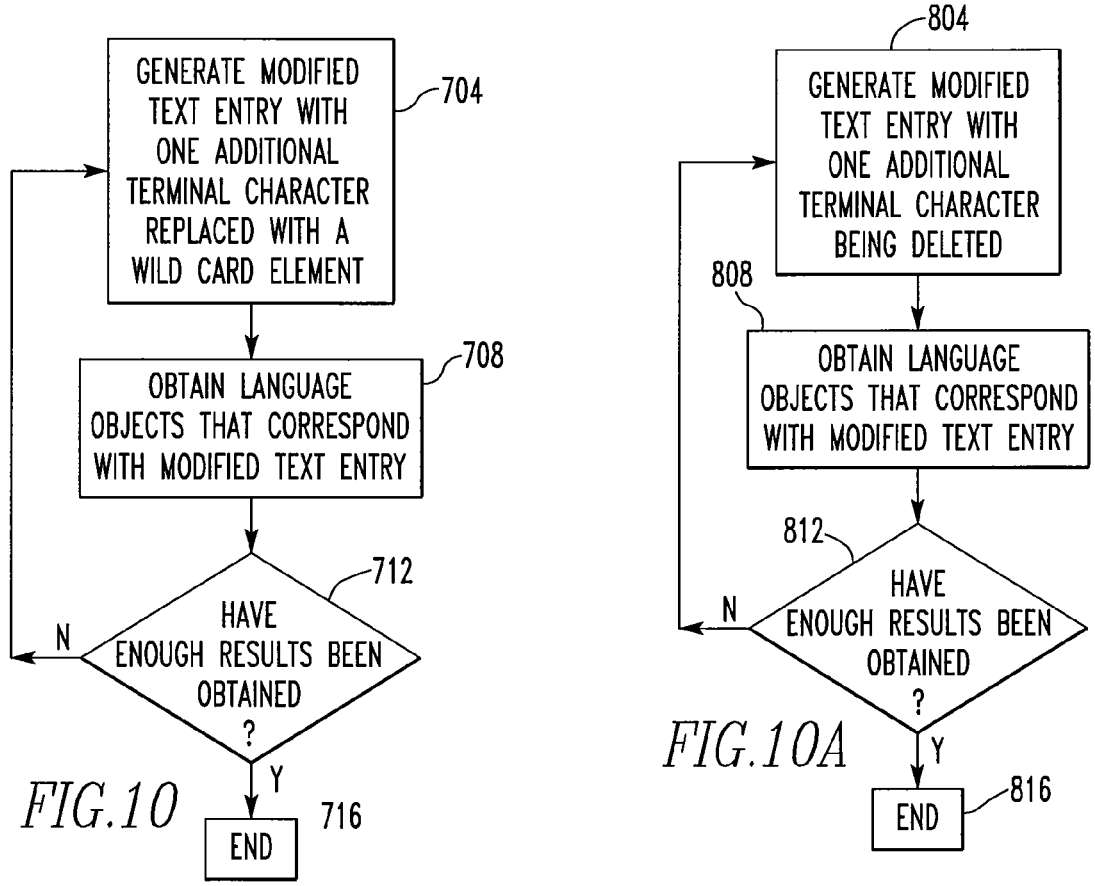
FIG.10
FIG.10A
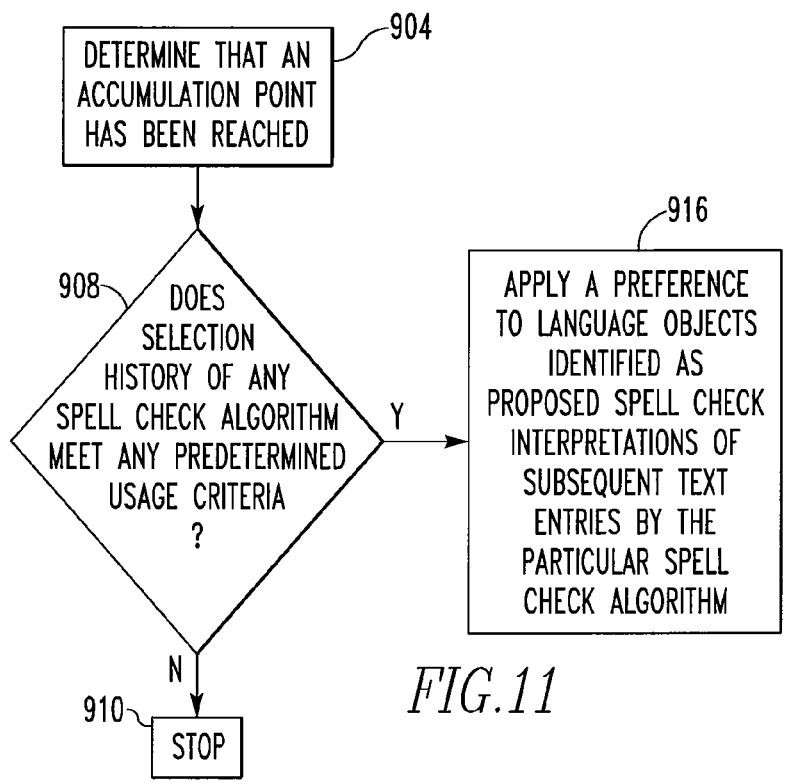
FIG.11

USE OF A SUFFIX-CHANGING SPELL CHECK ALGORITHM FOR A SPELL CHECK FUNCTION, AND ASSOCIATED HANDHELD ELECTRONIC DEVICE

BACKGROUND

1. Field

The disclosed and claimed concept relates generally to handheld electronic devices and, more particularly, to spell check functions on handheld electronic devices.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Spell check functions have typically been difficult to implement on handheld electronic devices. Due to limited storage capacity and limited processing capacity, spell check functions typically have been implemented in a very limited sense or have not been implemented at all. Previous efforts to implement spell check technology on handheld electronic devices have not been without limitation since they oftentimes have produced incomplete and/or inappropriate results which oftentimes have made the resultant device difficult to use. It thus would be desired to provide an improved handheld electronic device and improved spell check function implemented thereon.

BRIEF DESCRIPTION OF THE DRAWINGS

A full understanding of the disclosed and claimed concept can be obtained from the following Description when read in conjunction with the accompanying drawings in which:

FIG. 10 depicts other aspects of the spell check function regarding one way of changing a suffix portion of a text entry;

FIG. 10A depicts other aspects of the spell check function regarding another way of changing a suffix portion of a text entry; and FIG. 11 depicts other aspects of the spell check function regarding applying a preference to proposed spell check interpretations generated by a particular spell check algorithm.

Similar numerals refer to similar parts throughout the specification.

DESCRIPTION

Figure 1:
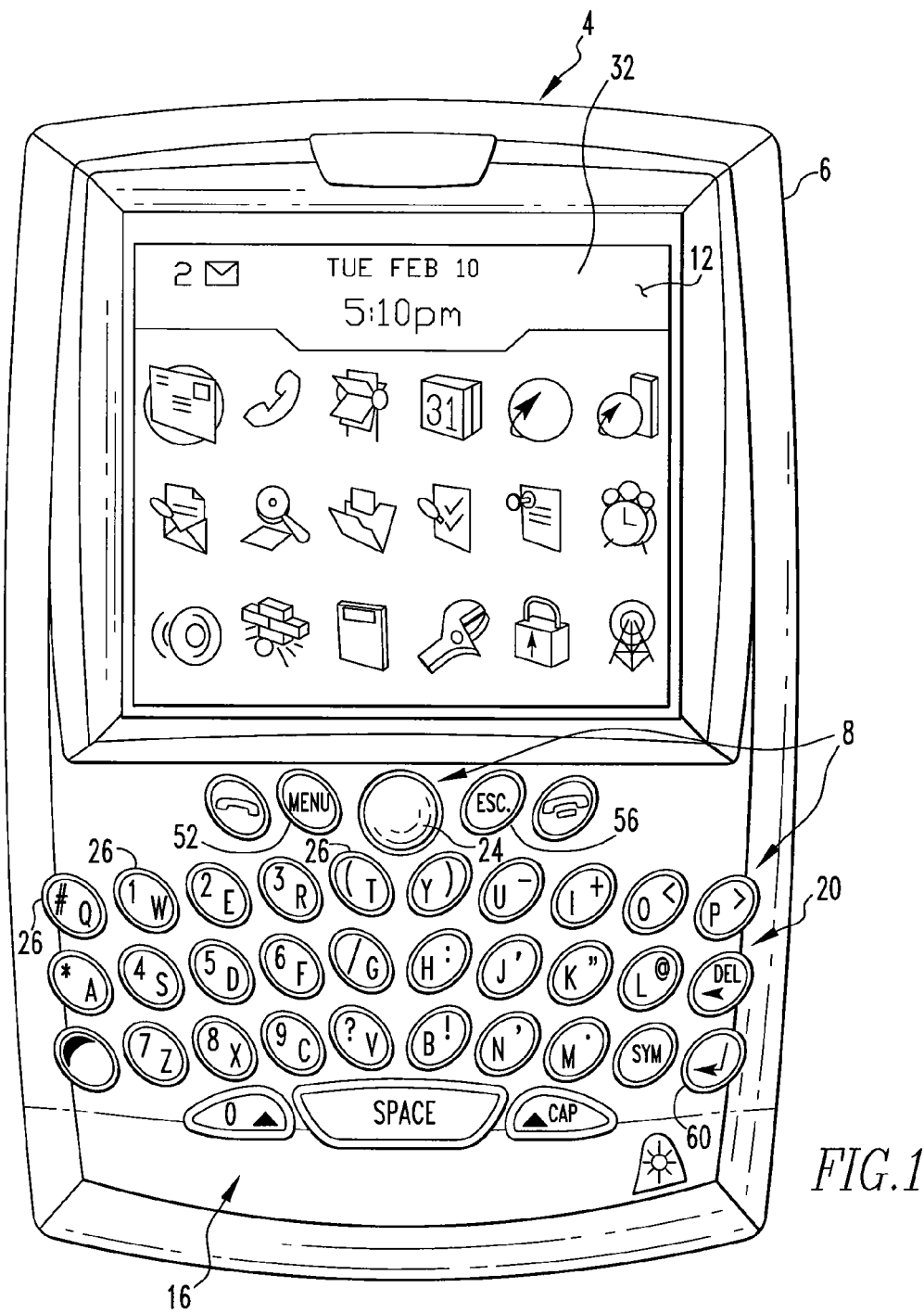
FIG. 1 is a front elevational view of an exemplary handheld electronic device in accordance with the disclosed and claimed concept upon which is performed an improved method in accordance with the disclosed and claimed concept.
Figure 2:
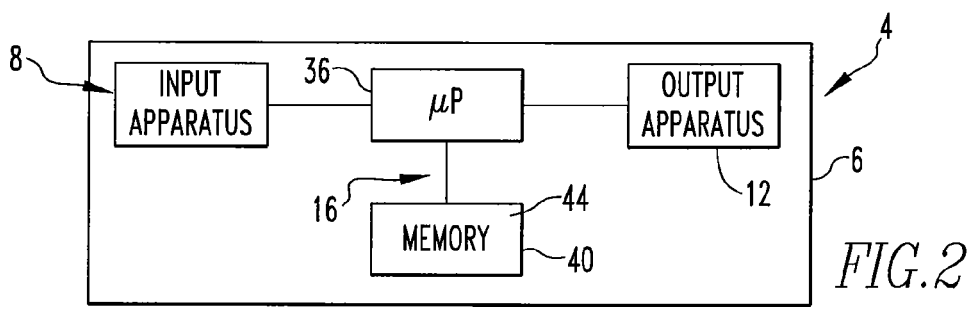
FIG. 2 is a schematic depiction of the handheld electronic device of FIG. 1.

An improved handheld electronic device 4 in accordance with the disclosed and claimed concept is indicated generally in FIG. 1 and is depicted schematically in FIG. 2. The improved handheld electronic device 4 comprises a housing 6 upon which are disposed an input apparatus 8, an output apparatus 12, and a processor apparatus 16. The input apparatus 8 provides input to the processor apparatus 16. The processor apparatus 16 provides output signals to the output apparatus 12.

The input apparatus 8 comprises a keypad 20 and a track ball 24. The keypad 20 in the exemplary embodiment depicted herein comprises a plurality of keys 26 that are each actuatable to provide input to the processor apparatus 16. The track ball 24 is freely rotatable in all directions to provide navigational input in all directions and other input to the processor apparatus 16, and additionally is translatable in a direction generally toward the handheld electronic device to provide other input, such as selection inputs. The keys 26 and the thumbwheel 24 serve as input members which are actuatable to provide input to the processor apparatus 16.

The keys 26 include a plurality of keys 26 to which a character such as a Latin letter and/or an Arabic digit have been assigned. The keys 26 further comprise a <MENU> key 52, an <ESCAPE> key 56, and an <ENTER> key 60. The exemplary output apparatus 12 comprises a display 32.

Examples of other input members not expressly depicted herein would include, for instance, a mouse or a track wheel for providing navigational inputs, such as could be reflected by movement of a cursor on the display 32, and other inputs such as selection inputs. Still other exemplary input members would include a touch-sensitive display, a stylus pen for making menu input selections on a touch-sensitive display displaying menu options and/or soft buttons of a graphical user interface (GUI), hard buttons disposed on a case of the handheld electronic device 4, and so on. Examples of other output devices would include a touch-sensitive display, an audio speaker, and so on.

The processor apparatus 16 comprises a processor 36 and a memory 40. The processor 36 may be, for example and without limitation, a microprocessor (μP) that interfaces with the memory 40. The memory 40 can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 40 has stored therein a number of routines 44 that are executable on the processor 36. As employed herein, the expression "a number of" and variations thereof shall refer broadly to a nonzero quantity, including a quantity of one. The routines 44 comprise a spell check function 44 among other routines.

Figure 3:
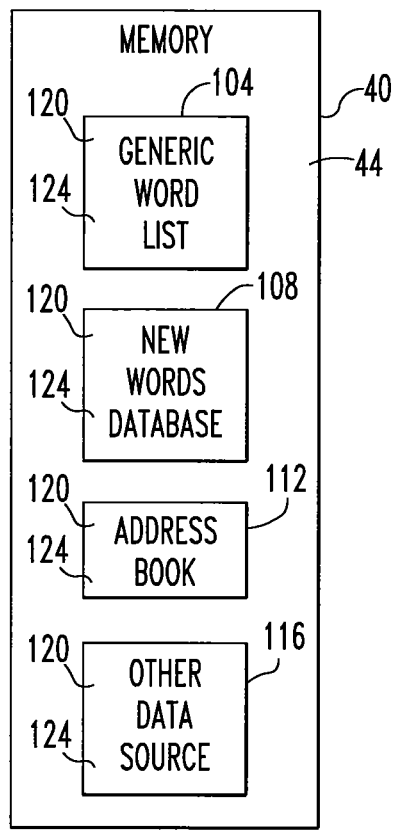
FIG. 3 is a schematic depiction of a memory of the handheld electronic device of FIG. 1.

FIG. 3 is a schematic depiction of the memory 40. It can be seen that the memory 40 comprises a generic word list 104, a new words database 108, an address book 112, and another data source 116, collectively referred to herein as linguistic data sources. The generic word list 104 has a plurality of language objects 120 stored therein, along with a plurality of frequency objects 124 stored therein. The language objects 120 are in the form of words in the present exemplary embodiment. Each language object 120 is associated with a frequency object 124 having a frequency value that is indicative of the relative frequency of the language object 120 in a language. In the present exemplary embodiment, wherein the exemplary depicted language is English, the generic word list 104 has roughly 35,000 language objects 120. The generic word list 104 is substantially inviolate, meaning that the data stored therein is static and unalterable. The static nature of the generic word list 104 facilitates searching thereof.

The new words database 108 likewise has a number of language objects 120 and a number of associated frequency objects 124 stored therein. The language objects 120 represent new words that the spell check function 44 has "learned". For instance, a new language object 120 in the new words database 108 might be a word that did not already exist as a language object 120 in the generic word list 104 but that was entered one or more times on the handheld electronic device 4 by the user. Upon storing a new language object 120 in the new words database 108, the system typically also stores an associated frequency object 124 having a relatively large frequency value, i.e., in the upper one-third or one-fourth of the applicable frequency range. In the present exemplary embodiment, the frequency range is 0-65,535, i.e., an amount that can be stored within two bytes of data.

The address book 112 is a data source having language objects 120 and associated frequency objects 124 stored therein. The other data source 116 is optional and can refer to any one or more other sources of linguistic data that would have language objects 120 and associated frequency objects 124 stored therein. The new words database 108, the address book 112, and the other data sources 116 are all in the nature of dynamic storage, meaning that they are alterable. That is, data can be added, changed, deleted, etc. The new words database 108, the address book 112, and the other data sources 116 typically are much smaller in size than the generic word list 104. As will be set forth in greater detail below, all of the linguistic data sources in the memory 40, i.e., the generic word list 104, the new words database 108, the address book 112, and the other data sources 116, are searched for the purpose of identifying linguistic results, i.e., the language objects 120 and the associated frequency objects 124 stored therein, when checking the spelling of the various text entries entered in any of a plurality of applications executed on the handheld electronic device 4.

While FIG. 3 depicts an exemplary situation wherein the linguistic data sources are stored in memory physically disposed on the handheld electronic device, it is understood that any one or more of the linguistic data sources could be stored remotely from the handheld electronic device 4 without departing from the disclosed and claimed concept. That is, FIG. 3 is not intended to limit the present concept, and it is thus expressly understood that any one or more of the linguistic data sources may be available to the handheld electronic device 4 without being physically stored thereon. For instance, one or more of the linguistic data sources may be stored on a server or other device that is available to the handheld electronic device 4.

Figure 4:
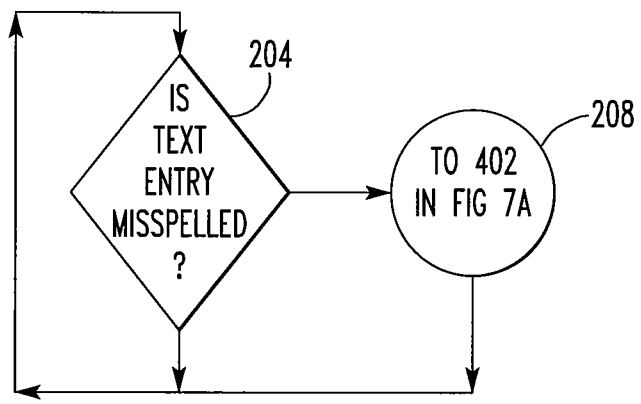
FIG. 4 is an exemplary flowchart depicting certain aspects of a spell check function in accordance with the disclosed and claimed concept which is implemented on the improved handheld electronic device of FIG. 1.

FIG. 4 depicts in generic terms the basic operation of the spell check function 44. Specifically, when the spell check function 44 is initiated, it is first determined whether a given text entry is misspelled as at 204. Such a determination would be made if the text entry, i.e., an entered word, cannot be found in any of the linguistic data sources in the memory 40. If a language object 120 that corresponds with a given text entry can be identified in a linguistic data source in the memory 40, processing loops back to 204 to continue with another text entry to determine, as at 204, whether such other text entry is misspelled. On the other hand, if it is determined at 204 that the text entry is misspelled, such as would occur if no language object 120 can be found in the memory 40 that corresponds with the text entry, the spelling correction function is initiated, as at 208, with respect to the misspelled text entry. The spelling correction function is described in greater detail below. Processing thereafter continues, as at 204, where another text entry can be evaluated for the correctness of its spelling.

Figure 5:
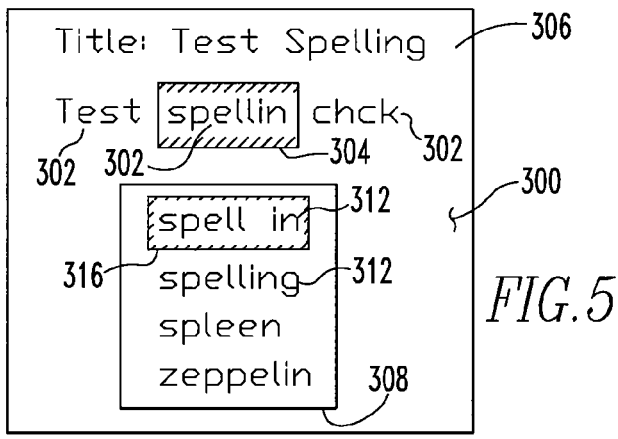
FIG. 5 is an exemplary screen shot depicting certain aspects of a user interface provided by the improved spell check function when a first application is active on the handheld electronic device.

FIG. 5 generally depicts aspects of a spell check user interface 300 that is provided by the spell check function 44 when a word processing application is active on the handheld electronic device 4. FIG. 5 depicts a plurality of text entries 302 entered in a data entry field 306 provided by the particular application that is active on the handheld electronic device 4. FIG. 5 further depicts the user interface 300 having highlighted, as at 304, the misspelled word "SPELLIN". Upon having determined that the text entry 302 "SPELLIN" is misspelled, i.e., determined that no corresponding language object 120 can be found in the memory 40, the spell check function 44 identified a number of proposed spell check interpretations 312 of the misspelled text entry 302 "SPELLIN".

The proposed spell check interpretations 312 have been output in a list 308 on the display 32. The uppermost proposed spell check interpretation 312 is depicted as being highlighted, as at 316. An actuation of the <ENTER> key 60 would result in the misspelled text entry 302 "SPELLIN" being replaced with the currently highlighted, as at 316, proposed spell check interpretation 312. The spell check function 44 would thereafter continue with the evaluation of another text entry 302.

Figure 6:
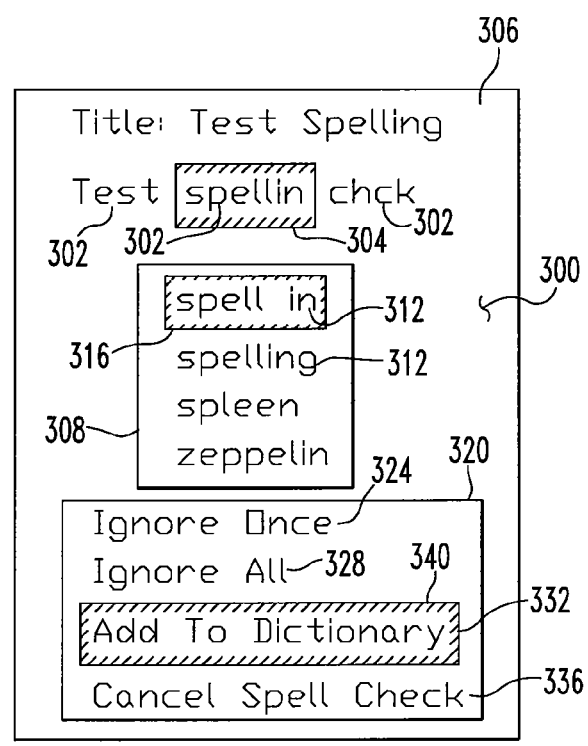
FIG. 6 is another screen shot depicting certain aspects of the user interface provided by the improved spell check function when the first application is active on the handheld electronic device.

On the other hand, an actuation of the <MENU> key 52 instead of the <ENTER> key 60 would result in the spell check function 44 displaying a plurality of selectable spell check options in a menu 320, as is depicted generally in FIG. 6. The exemplary menu 320 of selectable spell check options advantageously is output simultaneously with the list 308 of proposed spell check interpretations 312. The selectable spell check options include, for example, the <IGNORE ONCE> option 324, the <IGNORE ALL> option 328, the <ADD TO DICTIONARY> option 332, and the <CANCEL SPELL CHECK> option 336. It can be seen that the <ADD TO DICTIONARY> option 332 is currently highlighted, as at 340 in FIG. 6, and it would be selectable with an actuation of the <ENTER> key 60 or with an actuation of the track ball 24 in the direction generally toward the handheld electronic device 4.

Advantageously, many of the selectable spell check options in the menu 320 are actuatable by a navigational input of the track ball 24 to highlight, as at 340, the desired spell check option combined with an actuation of the track ball 24, and are also actuatable with an actuation of a particular key 26. For instance, the <IGNORE ONCE> option 324 can be actuated with a press-and-release actuation of the <ESCAPE> key 56. The <CANCEL SPELL CHECK> option 336 can be input with a press-and-hold actuation of the <ESCAPE> key 56. As mentioned above, the <ADD TO DICTIONARY> option 340 can be actuated by a press-and-release actuation of the <ENTER> key 60. Other key actuations will be apparent.

Figure 6A:
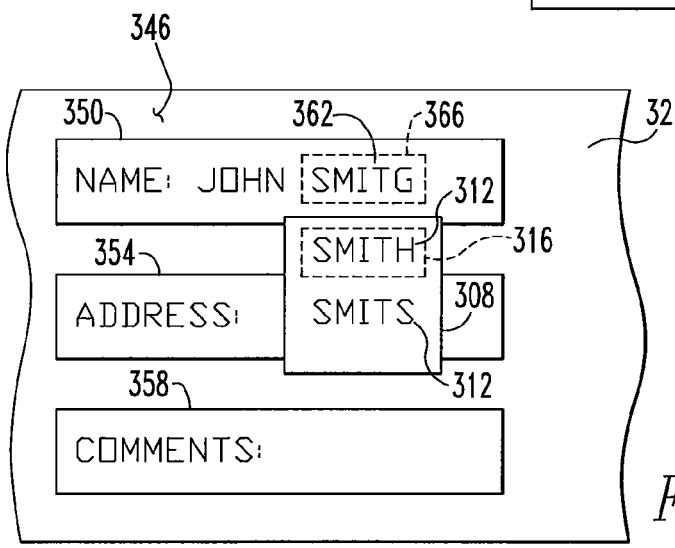
FIG. 6A is another screen shot depicting certain aspects of the user interface provided by the improved spell check function when a second application is active on the handheld electronic device.

FIG. 6A depicts the spell check function 44 operating when a different routine 44, such as an address book application, is active on the handheld electronic device 4. For example, a user interface 346 depicts a <NAME> data entry field 350, an <ADDRESS> data entry field 354, and a <COMMENTS> data entry field 358. FIG. 6A depicts the misspelled text entry "SMITG" 362 being highlighted, as at 366, and the spell check function 44 having output a list 308 of proposed spell check interpretations 312 of the misspelled text entry "SMITG" 362. The spell check function 44 is operable in any of the data entry fields 350, 354, and 358, for example, of the address book application as depicted in FIG. 6A. Likewise, the spell check function is operable in the data entry field 306 of the word processing application of FIGS. 5 and 6. It thus can be seen that the spell check function 44 advantageously is operable in many different data entry fields in many different applications.

When the list 308 of proposed spell check interpretations 312 is output, as at FIGS. 5 and 6A, an editing session is automatically opened with respect to the text entry that has been determined to be misspelled. That is, in addition to selecting one of the proposed spell check interpretations 312 to replace the misspelled text entry or actuating the <MENU> key 52 to obtain the menu 320 of selectable spell check options, the user can merely actuate one or more of the keys 26 to which a character is assigned to add the character, say, to the end of the word. A scroll or rotation of the track ball 24 toward the left will move a character entry cursor leftward where additional characters can be entered. As such, the spell check function 44 advantageously does not require the user to expressly enter an edit mode to open an editing session on a misspelled text entry, and rather an editing session is automatically opened upon the spell check function 44 determining that a text entry is misspelled.

As mentioned above with regard to FIG. 4, if the spell check function 44 determines at 204 that a text entry is misspelled, processing continues to 208 where the spelling correction function of the spell check function 44 is initiated. As a general matter, the spelling correction function of the disclosed and claimed concept provides a series of sequentially ordered spell check algorithms to which a text entry is subjected. Once a predetermined number of identified language objects 120 have been identified, such as through processing with the spell check algorithms, further subjecting of the text entry to additional spell check algorithms is ceased. It is understood, however, that other spell check methodologies that do not rely upon a series of spell check algorithms could be employed without departing from the present concept.

The spell check algorithms are sequentially arranged in a specific order, meaning that a text entry is first processed according to a first spell check algorithm and, if the language objects 120 that are identified as proposed spell check interpretations of the text entry do not reach a predetermined quantity, the text entry is processed according to a second spell check algorithm. If after processing according to the second spell check algorithm the language objects 120 that are identified as proposed spell check interpretations still do not reach the predetermined quantity, the text entry is processed according to a third spell check algorithm, and so forth.

The spell check algorithms, being sequentially ordered, can further be grouped as follows: A text entry will first be subjected to one or more spell check algorithms related to character configuration which, in the present exemplary embodiment, is a spell check algorithm that is related to ignoring capitalization and accenting. If the identified language objects 120 do not reach the predetermined quantity, the text entry is thereafter subjected to one or more spell check algorithms related to misspelling which, in the present exemplary embodiment, is a spell check algorithm that is related to phonetic replacement. If the identified language objects 120 do not reach the predetermined quantity, the text entry is thereafter subjected to one or more spell check algorithms related to mistyping. In this regard, "misspelling" generally refers to a mistake by the user as to how a particular word, for instance, is spelled, such as if the user incorrectly believed that the word --their-- was actually spelled "thier". In contrast, "mistyping" generally refers to a keying error by the user, such as if the user keyed an entry other than what was desired.

If the identified language objects 120 do not reach the predetermined quantity, the text entry is thereafter subjected to one or more spell check algorithms that are related to specific affixation rules, which typically are locale specific. For instance, in the German language two known words are kapitan and patent. These two words can be combined into a single expression, but in order to do so an s must be affixed between the two, thus kapitanspatent. Other types of affixation rules will be apparent.

If the identified language objects 120 do not reach the predetermined quantity, the text entry is thereafter subjected to one or more spell check algorithms related to metaphone analysis. As a general matter, a metaphone is a phonetic algorithm for indexing words by their sound. Both metaphone and phonetic rules are language-specific. Metaphones thus enable a linguistic expression to be characterized in a standardized fashion that is somewhat phonetic in nature. The use of metaphones can help to overcome certain misspelling errors.

If the identified language objects 120 still do not reach the predetermined quantity, the text entry is thereafter subjected to a spell check algorithm related to changing a suffix portion of the text entry. A modified algorithm for changing a suffix portion of a text entry may alternatively be employed, as will be described in detail below. Also, it is possible to execute the suffix-changing spell check algorithm prior to performing the aforementioned metaphone analysis without departing from the disclosed and claimed concept. That is, while it certainly is possible to execute the suffix-changing spell check algorithm at any time within the sequence of algorithms, it typically is executed last as a fallback algorithm. However, it might be desirable to execute such a fallback mechanism prior to executing the metaphone analysis algorithms due to the significant processing power required by them.

To more specifically describe the process, a given text entry such as a string of characters is subjected to a given spell check algorithm, which results in the generation of an expression, i.e., a modified text entry. For instance, the spell check algorithm might be directed toward replacing a given character string with a phonetic replacement. The resultant "expression" or modified text entry thus would be a characterization of the text entry as processed by the algorithm. For instance, the character string "ph" might be phonetically replaced by "f" and/or "gh". The language sources in the memory 20 would then be consulted to see if any language objects 120 corresponding with the text entry incorporating the phonetic replacements can be identified.

It is noted, however, that such a description is conceptual only, and that such processed or "resultant" character strings often are not searched individually. Rather, the result of subjecting a text entry to a spell check algorithm can many times result in a "regular expression" which is a global characterization of the processed text entry. For instance, a "regular expression" would contain wild card characters that, in effect, characterize the result of all of the possible permutations of the text entry according to the particular spell check algorithm. The result is that generally a single search can be performed on a "regular expression", with consequent savings in processing capacity and efficiency.

By way of example, if the user entered <OP><GH<><AS><BN>, such as might spell --phan--, the processing of --phan-- according to the exemplary phonetic replacement spell check algorithm would result in the regular expression characterized as {f|v|ph|gh|}{a|ei|ey}n, by way of example. The "ph" can be phonetically replaced by any of "f", "v", "ph", and "gh", and the "a" can be replaced by and of "a", "ei", and "ey". The "n" does not have any phonetic equivalent. The generic word list 104, the new words database 108, the address book 112, and the other data sources 116 would be checked to see if any language object 120 could be identified as being consistent with the expression {f|v|ph|gh|}{a|ei|ey}n. Any such identified language object 120 would be considered a proposed spell check interpretation of the original text entry. If, after such searching of the linguistic sources, the quantity of identified language objects 120 does not reach the predetermined quantity, the text entry --phan--, for example, would then be subjected to the sequentially next spell check algorithm, which would result in the generation of a different regular expression or of other processed strings, which would then be the subject of one or more new searches of the linguistic data sources for language objects 120 that are consistent therewith.

As mentioned above, the first spell check algorithm is one that ignores capitalization and/or accenting. The ignoring of capitalization and/or accenting can be performed with respect to capitalization and/or accenting that is contained in the text entry which is the subject of the search and/or that is contained in the stored language objects 120 being searched.

The sequentially next spell check algorithm is the aforementioned phonetic replacement algorithm. Certain character strings are replaced, i.e., in a regular expression, to identify language objects 120 that are phonetically similar to the text entry. Some exemplary phonetic replacements are listed in Table 1.

TABLE 1

Exemplary English phonetic rules wherein the two strings on each line are phonetically interchangeable

| | |
|---|---|
| "a" | "ei" |
| "a" | "ey" |
| "ai" | "ie" |
| "air" | "ear" |
| "air" | "ere" |
| "air" | "are" |
| "are" | "ear" |
| "are" | "eir" |
| "are" | "air" |
| "cc" | "k" |
| "ch" | "te" |
| "ch" | "ti" |
| "ch" | "k" |
| "ch" | "tu" |
| "ch" | "s" |
| "ci" | "s" |
| "ear" | "air" |
| "ear" | "are" |
| "ear" | "ere" |
| "ear" | "ier" |
| "eau" | "o" |
| "ee" | "i" |
| "ei" | "a" |
| "eir" | "are" |
| "eir" | "ere" |
| "ere" | "ear" |
| "ere" | "air" |
| "ere" | "eir" |
| "ew" | "oo" |
| "ew" | "ue" |
| "ew" | "u" |
| "ew" | "o" |
| "ew" | "ui" |
| "ey" | "a" |
| "f" | "ph" |
| "f" | "gh" |
| "ge" | "j" |
| "gg" | "j" |
| "gh" | "f" |
| "i" | "igh" |
| "i" | "ee" |
| "i" | "uy" |
| "ie" | "ai" |
| "ier" | "ear" |
| "ieu" | "oo" |
| "ieu" | "u" |
| "igh" | "i" |
| "j" | "ge" |
| "j" | "di" |
| "j" | "gg" |
| "k" | "qu" |
| "k" | "cc" |
| "k" | "ch" |
| "kw" | "qu" |
| "o" | "eau" |
| "o" | "ew" |
| "oe" | "u" |
| "oo" | "u" |
| "oo" | "ui" |
| "oo" | "ew" |
| "oo" | "ieu" |
| "ph" | "f" |
| "qu" | "k" |
| "qu" | "w" |
| "s" | "ch" |
| "s" | "ti" |
| "s" | "ci" |
| "shun" | "tion" |
| "shun" | "sion" |
| "shun" | "cion" |
| "ss" | "z" |
| "te" | "ch" |
| "ti" | "s" |
| "tu" | "ch" |
| "u" | "ieu" |
| "u" | "oo" |
| "u" | "ew" |
| "u" | "oe" |
| "ue" | "ew" |
| "uff" | "ough" |
| "ui" | "ew" |
| "ui" | "oo" |
| "uy" | "i" |
| "w" | "qu" |
| "z" | "ss" |

Each string in a text entry is replaced with all of the phonetic equivalents of the string. Regular expressions can sometimes be advantageously employed if multiple phonetic equivalents exist, as in the example presented above.

The sequentially next five spell check algorithms fall within the group of "mistyping" spell check algorithms. The first of these is the missing character insertion algorithm.

Each letter of the alphabet is added after each character of the text entry, again, as may be characterized in a regular expression.

The sequentially next algorithm is the character swapping algorithm wherein the characters of each sequential pair of characters in the text entry are swapped with one another. Thus, the text entry --phan-- would result in the character strings --hpan-- --pahn-- and --phna--. These three strings would then be the subject of separate searches of the linguistic data sources.

The sequentially next algorithm is the character omission algorithm wherein each character is individually omitted. Thus, the text entry --phan-- would result in the character strings --han-- --pan-- --phn-- and --pha--. These four strings would then be the subject of separate searches of the linguistic data sources.

The sequentially next algorithm is wherein the text is treated as two separate words. This can be accomplished, for instance, by inserting a <SPACE> between adjacent letter or, for instance, can be accomplished by simply searching a first portion and a second portion of the text entry as separate words, i.e., as separate sub-entries. Other ways of searching a text entry as two separate words will be apparent.

The sequentially next algorithm, and the final "mistyping" algorithm, is the character replacement algorithm wherein each character is individually replaced by the other characters in the alphabet. A regular expression may result from subjecting the text entry to the algorithm. As will be set forth in greater detail below, a preference can optionally be applied to certain identified language objects 120 based upon the proximity on the keypad 20 of the replacement character and the original character of the text entry.

The sequentially next algorithm is the spell check algorithms that are related to specific affixation rules, which typically are locale specific. As suggested above, in the German language an s must be affixed between the two known words kapitan and patent to form the combination thereof, thus kapitanspatent. Other types of affixation rules will be apparent.

The next rules are related to metaphone analysis. The first rule relates to generation of a metaphone regular expression, and then identifying language objects 120 in the linguistic sources that are consistent with the metaphone regular expression. Four additional and optional metaphone-related spell check algorithms, which are described in greater detail below, relate to metaphone manipulation.

Regarding the first metaphone-related spell check algorithm, it is noted that the metaphone regular expression can be formed, as a general matter, by deleting from the text entry all of the vowel sounds and by replacing all of the phonetically equivalent character strings with a standard metaphone "key". For instance, the various character strings "ssia", "ssio", "sia", "sio", "sh", "cia", "sh", "tio", "tia", and "tch" would each be replaced with the metaphone key "X". The characters strings "f", "v", and "ph" would each be replaced with the metaphone key "F". The metaphone regular expression is then created by placing an optional vowel wild card, which can constitute any number of different vowel sounds or no vowel sound, between each metaphone key. Searching using the metaphone regular expression can produce excellent spell check results, i.e., excellent identified language objects 120 outputtable as proposed spell check interpretations of a text entry, but the searching that is required can consume significant processing resources. As such, the metaphone regular expression spell check algorithm is advantageously performed only after the execution of many other spell check algorithms that require much less processing resource and which resulted in too few spell check results.

The next four spell check algorithms are optional and relate to metaphone manipulation and bear some similarity to the character "mistyping" spell check algorithms described above. More particularly, after the metaphone regular expression has been created, the four metaphone manipulation spell check algorithms relate to manipulation of the metaphone keys within the metaphone regular expression. Specifically, and in sequential order, the last four spell check-algorithms are a missing metaphone key insertion spell check algorithm, a metaphone key swapping spell check algorithm, a metaphone key omission spell check algorithm, and a metaphone key exchange spell check algorithm. These all operate in a fashion similar to those of the corresponding character-based "mistyping" algorithms mentioned above, except involving manipulations to the metaphone keys within the metaphone regular expression.

If the quantity of identified language objects 120 still is insufficient, the text entry is thereafter subjected to a suffix-changing spell check algorithm. For instance, a terminal character of the text entry might be replaced with a wild card element, i.e., a wild card character, which can be any character or an absence of a character. The linguistic data sources are then searched to find corresponding language objects 120. Such a spell check algorithm could be referred to as a "place holder" algorithm. If insufficient language objects 120 are identified as corresponding with such a modified text entry, the process is repeated with the two terminal characters of the original text entry each being replaced with a wild card element. If insufficient language objects 120 are identified with the two terminal characters of the original text entry being replaced with wild card elements, the final three characters of the original text entry are replaced with wild card elements, and so forth. Such modified text entries are generated and search until enough corresponding language objects 120 are identified as potential spell check interpretations of the original text entry.

In the present exemplary embodiment, the spell check function 44 seeks to find fifteen proposed spell check interpretations for any given misspelled text entry. That is, successive spell check algorithms are sequentially executed until fifteen proposed spell check interpretations have been identified. Also in the present exemplary embodiment, the spell check function 44 ultimately outputs, as at 406 in FIG. 7B, at most only eight of the fifteen identified proposed spell check interpretations. The quantities fifteen and eight are arbitrary, and different quantities can be used without departing from the present concept.

A modified algorithm for changing a suffix portion of a text entry may alternatively be employed, in which one or more of the terminal characters are merely deleted instead of being replaced with wild card elements. Such a modified and alternative spell check algorithm could be referred to as a "suffix chop" algorithm or "chop" algorithm. Such a situation would have the effect of replacing one or more of the terminal characters with merely the "absence of a character" aspect of a wild card element. The modified algorithm thus will generally produce fewer proposed spell check interpretations than the algorithm which employs the wild card elements. However, the modified version of the algorithm can be simpler to implement, can require less processor effort, and can still provide useful results. As noted above, it is possible to execute either of the suffix-changing spell check algorithms prior to performing the aforementioned metaphone analysis without departing from the disclosed and claimed concept.

In addition to employing the "place holder" and "chop" algorithms to find language objects 120 that correspond directly with a modified text entry, the modified text entry can itself be subjected to the sequence of spell check algorithms set forth above. Such processing would potentially provide additional useful proposed spell check interpretations.

Figure 7A:
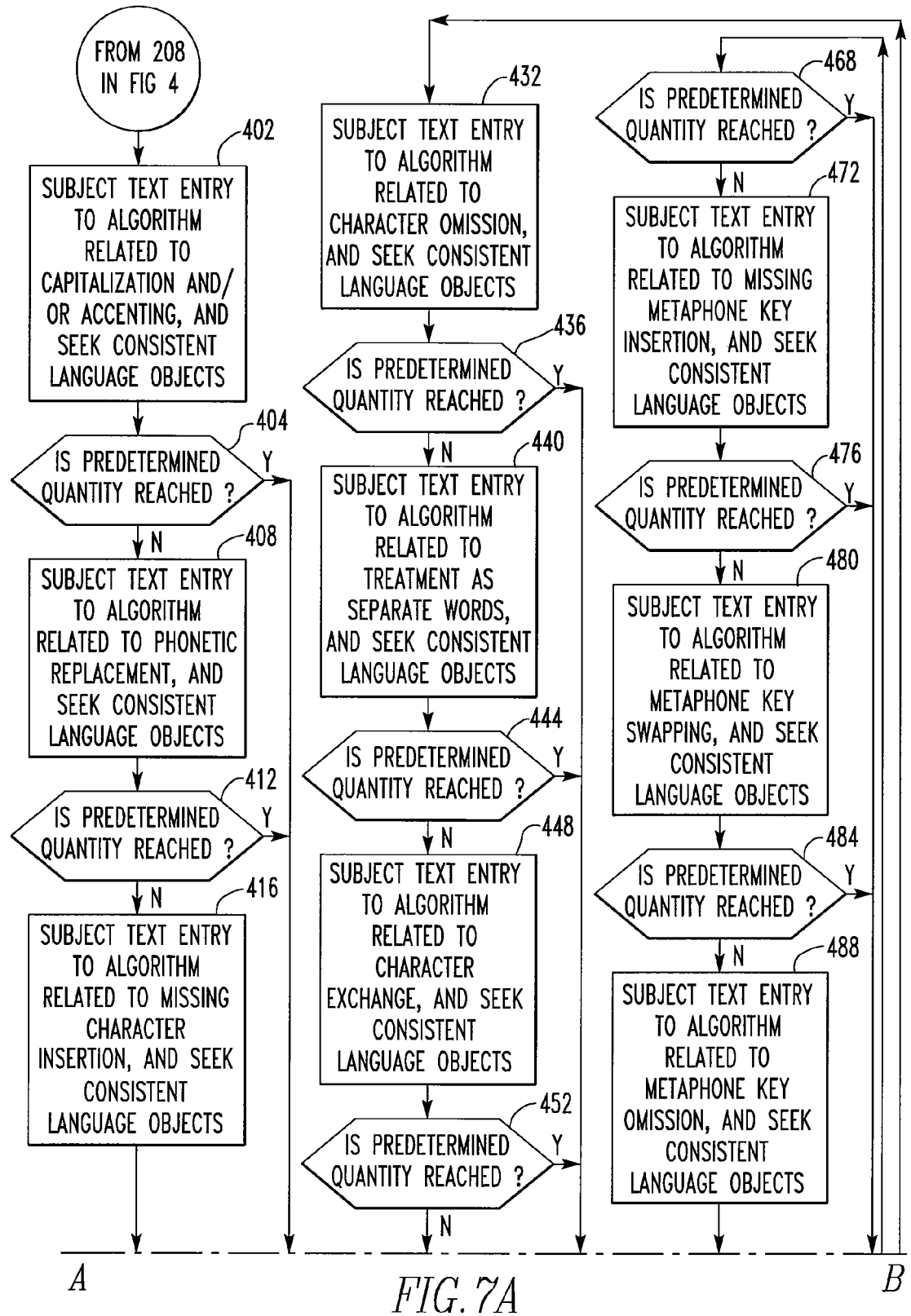
FIGS. 7A and 7B depict an exemplary flowchart showing certain aspects of the spell check function regarding the identification of proposed spell check interpretations of a text entry.
Figure 7B:
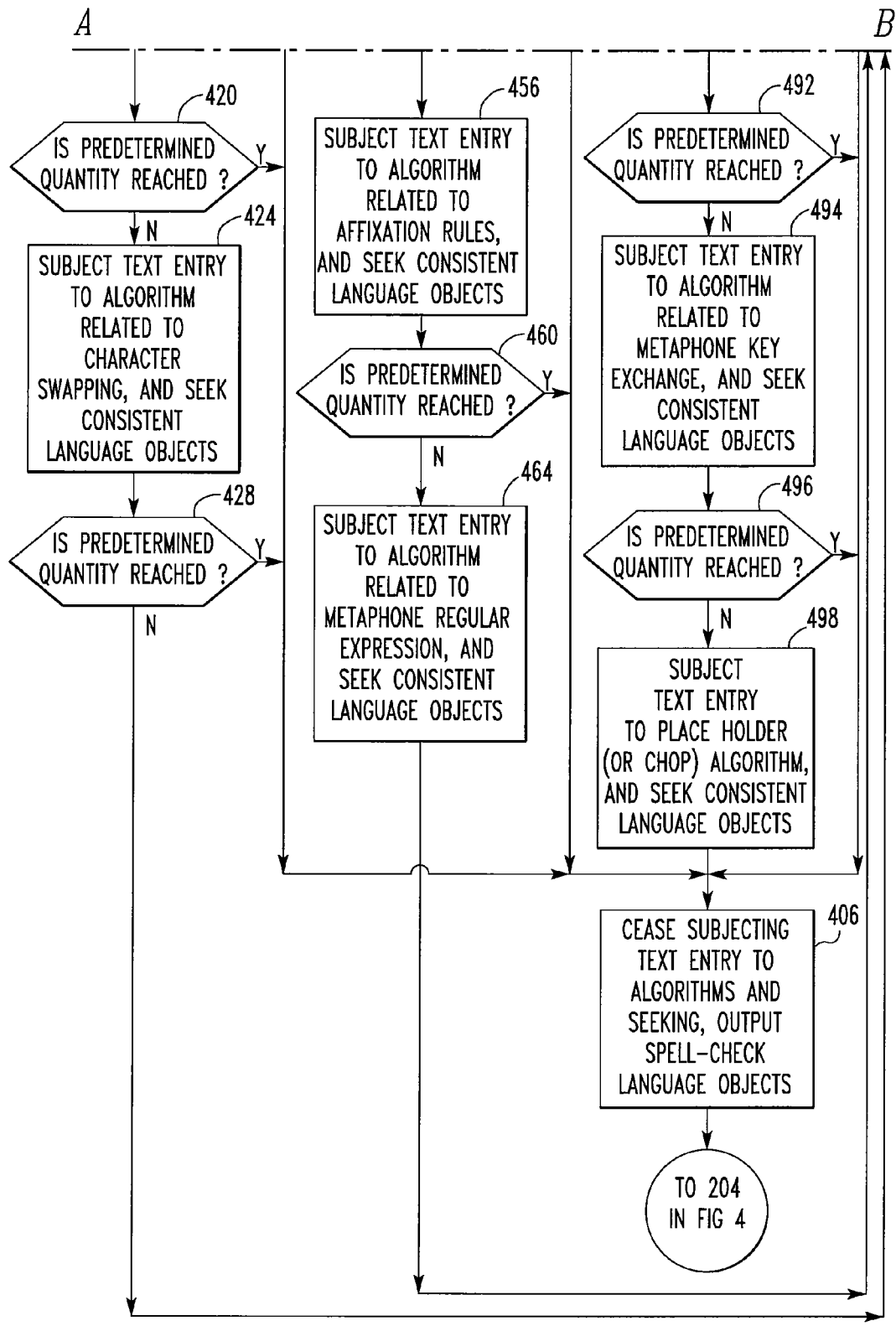

The spell check process is depicted generally in FIGS. 7A and 7B and is described herein. Processing starts at 402 where the text entry is subjected to the spell check algorithm related to ignoring capitalization and/or accenting, and the linguistic data sources are searched for corresponding language objects 120. Any corresponding language objects 120 that are found are added to a list. It is then determined at 404 whether or not the quantity of identified language objects 120 in the list has reached the predetermined quantity. If the predetermined quantity has been reached, processing continues to 406 where at least some of the identified language objects 120 are output, and processing thereafter returns to the main process at 204 in FIG. 4.

On the other hand, if it is determined at 404 that the predetermined quantity has not been reached, processing continues to 408 where the text entry is subjected to the spell check algorithm related to phonetic replacement, and the linguistic data sources are searched for corresponding language objects 120. Any identified language objects 120 that are identified are added to the list. It is then determined at 412 whether or not the quantity of identified language objects 120 in the list has reached the predetermined quantity. If the predetermined quantity has been reached, processing continues to 406 where at least some of the identified language objects 120 are output.

Otherwise, processing continues to 416 where the text entry is subjected to the spell check algorithm related to missing character insertion, and the linguistic data sources are searched for corresponding language objects 120. Any corresponding language objects 120 that are identified are added to the list. It is then determined at 420 whether or not the quantity of identified language objects 120 in the list has reached the predetermined quantity. If the predetermined quantity has been reached, processing continues to 406 where at least some of the identified language objects 120 are output.

Otherwise, processing continues to 424 where the text entry is subjected to the spell check algorithm related to character swapping, and the linguistic data sources are searched for corresponding language objects 120. Any corresponding language objects 120 that are identified are added to the list. It is then determined at 428 whether or not the quantity of identified language objects 120 in the list has reached the predetermined quantity. If the predetermined quantity has been reached, processing continues to 406 where at least some of the identified language objects 120 are output.

Otherwise, processing continues to 432 where the text entry is subjected to the spell check algorithm related to character omission, and the linguistic data sources are searched for corresponding language objects 120. Any corresponding language objects 120 that are identified are added to the list. It is then determined at 436 whether or not the quantity of identified language objects 120 in the list has reached the predetermined quantity. If the predetermined quantity has been reached, processing continues to 406 where at least some of the identified language objects 120 are output.

Otherwise, processing continues to 440 where the text entry is subjected to the spell check algorithm related to treatment of the text entry as separate words, and the linguistic data sources are searched for corresponding language objects 120. Any corresponding language objects 120 that are identified are added to the list. It is then determined at 444 whether or not the quantity of identified language objects 120 in the list has reached the predetermined quantity. If the predetermined quantity has been reached, processing continues to 406 where at least some of the identified language objects 120 are output.

Otherwise, processing continues to 448 where the text entry is subjected to the spell check algorithm related to character exchange, and the linguistic data sources are searched for corresponding language objects 120. Any corresponding language objects 120 that are identified are added to the list. As will be set forth in greater detail below, a preference can be applied to those identified language objects 120 wherein the replacement character and the original character, i.e., the replaced character, in the text entry are disposed on the keypad 20 within a predetermined proximity. It is then determined at 452 whether or not the quantity of identified language objects 120 in the list has reached the predetermined quantity. If the predetermined quantity has been reached, processing continues to 406 where at least some of the identified language objects 120 are output.

Otherwise, processing continues to 456 where the text entry is subjected to the spell check algorithm related to affixation rules, and the linguistic data sources are searched for corresponding language objects 120. Any corresponding language objects 120 that are identified are added to the list. It is then determined at 460 whether or not the quantity of identified language objects 120 in the list has reached the predetermined quantity. If the predetermined quantity has been reached, processing continues to 406 where at least some of the identified language objects 120 are output.

Otherwise, processing continues to 464 where the text entry is subjected to the spell check algorithm related to creation of the metaphone regular expression, and the linguistic data sources are searched for corresponding language objects 120. Any corresponding language objects 120 that are identified are added to the list. It is then determined at 468 whether or not the quantity of identified language objects 120 in the list has reached the predetermined quantity. If the predetermined quantity has been reached, processing continues to 406 where at least some of the identified language objects 120 are output.

Otherwise, processing continues to 472 where the text entry is subjected to the spell check algorithm related to missing metaphone key insertion, and the linguistic data sources are searched for corresponding language objects 120. Any corresponding language objects 120 that are identified are added to the list. It is then determined at 476 whether or not the quantity of identified language objects 120 in the list has reached the predetermined quantity. If the predetermined quantity has been reached, processing continues to 406 where at least some of the identified language objects 120 are output.

Otherwise, processing continues to 480 where the text entry is subjected to the spell check algorithm related to metaphone key swapping, and the linguistic data sources are searched for corresponding language objects 120. Any corresponding language objects 120 that are identified are added to the list. It is then determined at 484 whether or not the quantity of identified language objects 120 in the list has reached the predetermined quantity. If the predetermined quantity has been reached, processing continues to 406 where at least some of the identified language objects 120 are output.

Otherwise, processing continues to 488 where the text entry is subjected to the spell check algorithm related to metaphone key omission, and the linguistic data sources are searched for corresponding language objects 120. Any corresponding language objects 120 that are identified are added to the list. It is then determined at 492 whether or not the quantity of identified language objects 120 in the list has reached the predetermined quantity. If the predetermined quantity has been reached, processing continues to 406 where at least some of the identified language objects 120 are output.

Otherwise, processing continues to 494 where the text entry is subjected to the spell check algorithm related to metaphone key exchange, and the linguistic data sources are searched for corresponding language objects 120. It is then determined at 496 whether or not the quantity of identified language objects 120 in the list has reached the predetermined quantity. If the predetermined quantity has been reached, processing continues to 406 where at least some of the identified language objects 120 are output.

Otherwise, processing continues to 498 where the text entry is subjected to the spell check algorithm related to changing the suffix of the text entry, i.e., the "place holder" algorithm or, alternatively, the "chop" algorithm, to generate a modified text entry. The linguistic data sources are searched for language objects 120 that correspond with the modified text entry. As mentioned elsewhere herein, the text entry could be subjected to the suffix-changing spell check algorithm prior to subjecting it to the metaphone analysis spell check algorithms without departing from the disclosed and claimed concept. Also as mentioned herein, the modified text entry that results from the "place holder" or "chop" algorithms could itself be processed with the series of spell check algorithms, such as if the modified text entry were itself processed beginning at 402 of FIG. 7A and continuing thereafter as depicted in FIGS. 7A and 7B and as described above. Such further processing of the modified text entry likely would produce additional useful proposed spell check interpretations.

Regardless of whether the modified text entry is itself subjected to the sequence of spell check algorithms, processing ultimately continues to 406 where at least some of the identified language objects 120 are output. Processing afterward returns to the main process at 204 in FIG. 4.

Figure 8:
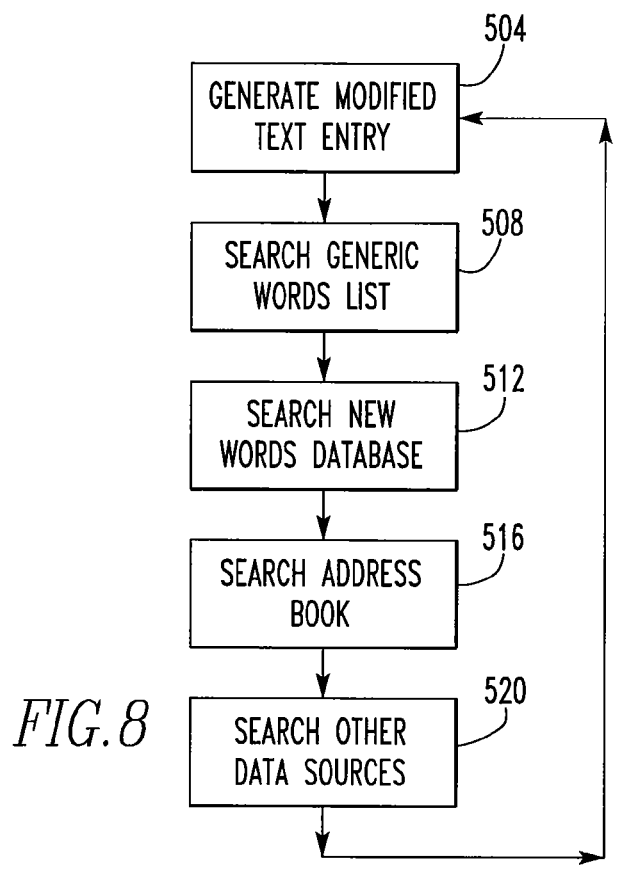
FIG. 8 depicts other aspects of the spell check function regarding the data sources in the memory that are searched for linguistic data.

As mentioned elsewhere herein, all of the linguistic data sources in the memory 40 are searched when seeking to identify language objects 120 that correspond with the modified text entries that are created by the various spell check algorithms during operation of the spelling correction function. Specifically, and as is shown in FIG. 8, the spell check algorithm to which a text entry is being subjected generates a modified text entry, as at 504. It is understood that the modified text entry might actually be in the form of a regular expression.

Thereafter, the generic word list 104 is searched, as at 508, the new words database 108 is searched, as at 512, the address book 112 is searched, as at 516, and the other data sources 116 are searched, as at 520. Processing thereafter returns to 504 where an additional modified text entry can be generated, either with the same spell check algorithm or a different one, as appropriate. The particular order in which the various linguistic data sources are searched is not necessarily important, and different searching orders than that depicted in FIG. 8 can be used without departing from the disclosed and claimed concept. The various identified language objects 120 are collected in a list, at least a portion of which is ultimately output, as at 406 in FIG. 7B.

As mentioned above, the language objects 120 that are identified by execution of the character exchange spell check algorithm can have a preference applied thereto based upon proximity on the keypad 20 between the character being replaced and the replacement character. For instance, in the example shown in FIG. 6A, the misspelled text entry 362 "SMITG" probably was intended by the user to be "SMITH", i.e., with the character "G" in the original text entry being replaced by the character "H". The character exchange spell check algorithm is likely the first algorithm that will identify the language object 120 "SMITH" as a proposed spell check interpretation of "SMITG". The character exchange spell check algorithm might also identify the language object 120 "SMITS" as a proposed spell check interpretation of "SMITG". However, it can be seen from FIG. 1 that the "G" key 26 and the "H" key 26 are disposed adjacent one another. On the other hand, the "G" key 26 and the "S" key 26 are disposed three keys apart. If it is assumed that the "G" might be the result of a "mistyping" by the user, i.e., the user intended to actuate the "H" key 26 and instead mistakenly actuated the "G" key 26, it would make practical sense to apply a preference to "SMITH" as compared with "SMITS" due to the much closer proximity of the "G" key 26 to the "H" key 26 than to the "S" key 26.

Any threshold of proximity can be employed, and any type of preference can be applied. An exemplary threshold of proximity would be that the original and replacement characters would have to be disposed on adjacent keys 26, i.e., the keys 26 would be disposed side-by-side. For example, the keys 26 "R" "T" "Y" "F" "H" "C" "V" and "B" could be considered to be adjacent the "G" key 26.

As a general matter, the language objects 120 that are identified as proposed spell check interpretations of a text entry are output in order of decreasing frequency value of the associated frequency object 124, although other prioritization methodologies can be employed. Accordingly, the "nominal frequency" provided by the frequency value of the associated frequency object 124 can be multiplied by another number to achieve an overall, i.e., adjusted, frequency. An exemplary other number could be the integer value three, with the result that the nominal frequency value of "SMITH" would be multiplied by three to obtain the adjusted frequency for purposes of output ranking of the proposed spell check interpretations. Other types of preferences can, of course, be envisioned without departing from the disclosed and claimed concept.

Figure 9:
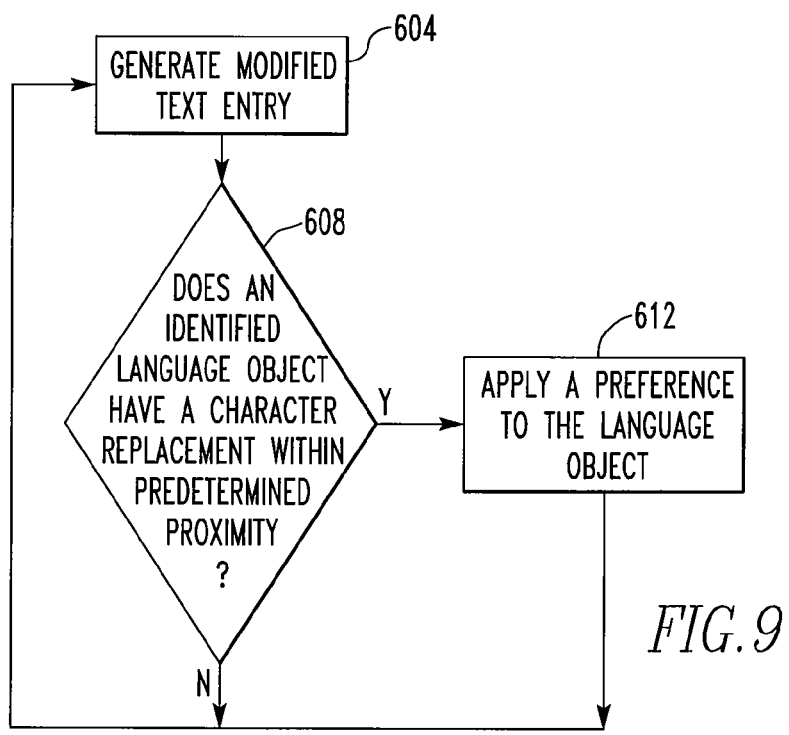
FIG. 9 depicts other aspects of the spell check function regarding applying a preference to certain proposed spell check interpretations.

An exemplary flowchart depicting such preferencing is shown in FIG. 9. The character exchange spell check algorithm will generate, as at 604, a modified text entry, i.e., the modified text entry "SMITH" in place of the misspelled text entry "SMITG". The system will then determine, as at 608, whether or not the modified text entry resulted from replacing one character in the original text entry with a character within a predetermined proximity on the keypad 20. If the predetermined proximity is that the characters must be adjacent, the result at 608 would be affirmative since the "G" and "H" keys 26 are disposed adjacent one another on the keypad 20. If the answer at 608 is affirmative, processing would continue, as at 612, where the preference would be applied to the identified language object 120. Otherwise, processing would return to 604 where another modified text entry would be generated, as appropriate. When the various proposed spell check interpretations of "SMITG" are output, as at 406 in FIG. 7B, the tripled nominal frequency value of "SMITH" likely will give it a priority position in the list 308 of proposed spell check interpretations 312 when compared with the other proposed spell check interpretations 312, as can be seen in FIG. 6A.

As mentioned above, a misspelled text entry can be subject to a suffix-changing spell check algorithm such as the "place holder" algorithm wherein one or more terminal characters of the original text entry are each replaced with a wild card character, i.e., a wild card element, which can refer to any character in the relevant alphabet or an absence of a character. Any exemplary flowchart depicting aspects of the algorithm is shown in FIG. 10. Processing would start, as at 704, where a modified text entry would be generated with one additional terminal character being replaced with a wild card element. With the first operation of the "place holder" algorithm with respect to a given misspelled text entry, the first modified text entry would have only the single terminal character replaced with a wild card element.

Processing would then continue, as at 708, where linguistic objects 120 that correspond with the modified text entry would be sought from the various linguistic data sources in the memory 20. In this regard, one proposed spell check interpretation could be a language object having the same number of characters as the original text entry and matching all but the terminal character of the original text entry. Another proposed spell check interpretation could be a language object having the one character fewer than the original text entry and matching all but the terminal character of the original text entry.

It is then determined, as at 712, whether enough linguistic results, i.e., a sufficient quantity of language objects 120, have been identified. If enough language objects 120 have been identified, processing ends, as at 716. The results would then be output as at 406 in FIG. 7B. However, if insufficient language objects 120 have been identified, processing continues, as at 704, where another modified text entry is generated having one additional terminal character of the original text entry being replaced with a wild card element, i.e., the original text entry except having a pair of wild card elements in place of the two terminal characters thereof. Processing would thereafter continue, as at 708 where additional language objects 120 could be identified, and at 712 where the sufficiency of the quantity of identified language objects 120 would be evaluated, etc.

An alternative modified suffix-changing spell check algorithm, i.e., the "chop" algorithm is depicted generally in the flowchart shown in FIG. 10A. In a fashion similar to the "place holder" spell check algorithm of FIG. 10, processing would start, as at 804, where a modified text entry would be generated with one additional terminal character being deleted. With the first operation of the "chop" algorithm with respect to a given misspelled text entry, the first modified text entry would have only the single terminal character deleted.

Processing would then continue, as at 808, where linguistic objects 120 that correspond with the modified text entry would be sought from the various linguistic data sources in the memory 20. The proposed spell check interpretations would each be language objects having one character fewer than the original text entry and matching all but the deleted terminal character of the original text entry.

It is then determined, as at 812, whether a sufficient quantity of language objects 120 have been identified. If enough language objects 120 have been identified, processing ends, as at 816. The results would then be output as at 406 in FIG. 7B. However, if insufficient language objects 120 have been identified, processing continues, as at 804, where another modified text entry is generated having one additional terminal character of the original text entry being deleted, i.e., the original text entry except having the two terminal characters thereof deleted. Processing would thereafter continue, as at 808 where additional language objects 120 could be identified, and at 812 where the sufficiency of the quantity of identified language objects 120 would be evaluated, etc.

As is depicted in a flowchart in FIG. 11, the spell check function 44 additionally can provide a learned compensation favoring any of the sequentially executed spell check algorithms that is used to a relatively frequent extent. For instance, if it is determined that the user tends to transpose pairs of characters in a text entry, the character swapping spell check algorithm likely would produce proposed spell check interpretations that are selected by the user with a greater regularity than proposed spell check interpretations generated by other spell check algorithms. Over time, the system would determine that the user is selecting proposed spell check interpretations generated by the character swapping spell check algorithm with a relatively high regularity and, as a result, would apply a preference to future proposed spell check interpretations generated by the character swapping spell check algorithm.

Such high regularity of user selection could be determined in any of a variety of ways. For instance, the system could wait until a significant number of proposed spell check interpretations have been selected by the user in replacing misspelled text entries. For instance, the system might wait until it has accumulated data regarding one thousand spell check selections, or ten thousand. Alternatively, the system might wait until a single spell check algorithm generated a specific quantity of proposed spell check interpretations that were selected by the user, say 100 or 500. Or, the system might evaluate the accumulated data on spell check selections after one month or one year of usage, regardless of overall quantity of selections. In any event, the system stores data as to which spell check algorithm generated each proposed spell check interpretation that ultimately was selected by the user.

Once an accumulation point has been reached, as at 904 in FIG. 11, the system will then determine, as at 908, whether the selection history of any spell check algorithm meets any predetermined usage criteria. For instance, one usage criterion might be that a given spell check algorithm generated proposed spell check interpretations that were selected with a frequency at or above a predetermined threshold, such as if 20% or more of the time a proposed spell check interpretation was selected by the user it was generated by a particular algorithm. By way of another example, the system might determine whether or not the rate at which the user is selecting proposed spell check interpretations generated by a particular spell check algorithm is at or above a certain threshold frequency among the overall quantity of all words input. For instance, if a user selected a proposed spell check interpretation generated by a particular spell check algorithm more than three time for every one hundred input word, a predetermined usage criterion might be met. It thus can be seen that any one or more usage criteria can be used, whether or not expressly described herein.

If it is determined at 908 that no predetermined usage criteria have been met, processing stops, as at 910. However, if one or more predetermined usage criteria have been met at 908 with regard to a particular spell check algorithm, processing continues, as at 912, where a preference is applied to the particular algorithm and, more particularly, to the proposed spell check interpretations subsequently generated by the particular algorithm. For instance, the system might multiply the nominal frequency value of the frequency object 124 associated with an identified language object 100 by a certain multiplication factor. Upon outputting at 406 in FIG. 7B, the preferred language objects 120, i.e., the language objects generated by the particular algorithm, likely would be output at a position of preference.

In one exemplary embodiment, the nominal frequency values of the language objects 120 identified by executing any given spell check algorithm are multiplied by a factor that is specific to the algorithm. For instance, spell check algorithms earlier in the sequence might have a larger multiplication factor than spell check algorithms later in the sequence. This would have a tendency to output language objects 120 generated by earlier spell check algorithms in the sequence at higher priorities than those generated by later spell check algorithms in the sequence. The preference from 912 that is to be applied to the proposed spell check interpretations that are generated by a particular spell check algorithm can be in the form of an additional multiplier, or by increasing the preexisting multiplying factor of the algorithm. Other preferencing schemes will be apparent.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling text input on a handheld electronic device that comprises a memory having a plurality of language objects stored therein, the method comprising:
   detecting a text entry comprising a plurality of characters;
   responsive to determining that no language object in the memory corresponds with the detected text entry, searching the memory to identify as proposed spell-check interpretations of the text entry language objects that correspond with a modified text entry that comprises the text entry having a wild card element in place of each of a number of terminal characters of the text entry, each wild card element being any character, including an absence of a character, in an alphabet;
   determining that an insufficient quantity of proposed spell-check interpretations have been identified, and responsive thereto:
      generating another modified text entry having one additional terminal character replaced with the wild card element; and
      searching the memory to identify as proposed spell-check interpretations of the text entry language objects that correspond with the another modified text entry,
      wherein if insufficient language objects have been identified, repeating said generating and said searching until sufficient language objects have been identified; and
   outputting one or more of the proposed language objects as proposed spell-check interpretations of the text entry.

2. The method of claim 1, further comprising:
   detecting an additional text entry comprising a number of additional characters;
   determining that at least an initial portion of a given language object corresponds with the particular language object followed by the additional text entry; and
   outputting the at least initial portion of the given language object.

3. The method of claim 1, further comprising:
   employing as the modified text entry the text entry having a wild card element in place of a terminal character of the text entry;
   making a determination that no language object corresponds with the text entry having a wild card element in place of a terminal character of the text entry;
   responsive to said making a determination, employing as the modified text entry the text entry having a pair of wild card elements in place of a pair of terminal characters of the text entry; and
   identifying the particular language object at least partially on the basis that it corresponds with the text entry having the pair of wild card elements in place of the pair of terminal characters of the text entry.

4. The method of claim 1, further comprising:
   employing as the modified text entry the text entry having a wild card element in place of each of a first number of terminal characters of the text entry;
   identifying the particular language object as a proposed spell-check interpretation at least partially on the basis that it corresponds with the text entry having a wild card element in place of each of a first number of terminal characters of the text entry;
   making a determination that the quantity of proposed spell-check interpretations is fewer than a predetermined threshold;
   responsive to said making a determination, identifying a number of language objects that correspond with the text entry having a wild card element in place of each of a second number of terminal characters of the text entry, the second number being greater than the first number; and
   outputting at least some of the number of language objects as additional proposed spell-check interpretations.

5. The method of claim 4 wherein each language object has associated therewith a frequency object having a frequency value indicative of the relative frequency of the language object in a language, and further comprising outputting the particular language object and the at least some of the number of language objects in order of decreasing frequency value.

6. The method of claim 1 wherein the memory has a number of spell check algorithms stored therein for execution on the handheld electronic device, and further comprising subjecting the modified text entry to at least some of the spell check algorithms to seek proposed spell check interpretations of the text entry.

7. A handheld electronic device comprising:
   a processor apparatus comprising a processor and a memory having a plurality of language objects stored therein;
   an input apparatus structured to provide input to the processor apparatus;
   an output apparatus structured to receive output signals from the processor apparatus;
   the memory having stored therein a number of routines having instructions which, when executed on the processor, cause the handheld electronic device to perform operations comprising:
   detecting a text entry comprising a plurality of characters;
   responsive to determining that no language object in the memory corresponds with the detected text entry, searching the memory to identify as proposed spell-check interpretations of the text entry language objects that correspond with a modified text entry that comprises the text entry having a wild card element in place of each of a number of terminal characters of the text entry, each wild card element being any character, including an absence of a character, in an alphabet;
   determining that an insufficient quantity of proposed spell-check interpretations have been identified, and responsive thereto:
      generating another modified text entry having one additional terminal character replaced with the wild card element; and
      searching the memory to identify as proposed spell-check interpretations of the text entry language objects that correspond with the another modified text entry, wherein if insufficient language objects have been identified, repeating said generating and said searching until sufficient language objects have been identified; and outputting one or more of the proposed language objects as proposed spell-check interpretations of the text entry.

8. The handheld electronic device of claim 7 wherein the operations further comprise:
   detecting an additional text entry comprising a number of additional characters;
   determining that at least an initial portion of a given language object corresponds with the particular language object followed by the additional text entry; and
   outputting the at least initial portion of the given language object.

9. The handheld electronic device of claim 7 wherein the operations further comprise:
   employing as the modified text entry the text entry having a wild card element in place of a terminal character of the text entry;
   making a determination that no language object corresponds with the text entry having a wild card element in place of a terminal character of the text entry;
   responsive to said making a determination, employing as the modified text entry the text entry having a pair of wild card elements in place of a pair of terminal characters of the text entry; and
   identifying the particular language object at least partially on the basis that it corresponds with the text entry having the pair of wild card elements in place of the pair of terminal characters of the text entry.

10. The handheld electronic device of claim 7 wherein the operations further comprise:
    employing as the modified text entry the text entry having a wild card element in place of each of a first number of terminal characters of the text entry;
    identifying the particular language object as a proposed spell-check interpretation at least partially on the basis that it corresponds with the text entry having a wild card element in place of each of a first number of terminal characters of the text entry;
    making a determination that the quantity of proposed spell-check interpretations is fewer than a predetermined threshold;
    responsive to said making a determination, identifying a number of language objects that correspond with the text entry having a wild card element in place of each of a second number of terminal characters of the text entry, the second number being greater than the first number; and
    outputting at least some of the number of language objects as additional proposed spell-check interpretations.

11. The handheld electronic device of claim 10 wherein each language object has associated therewith a frequency object having a frequency value indicative of the relative frequency of the language object in a language, and wherein the operations further comprise outputting the particular language object and the at least some of the number of language objects in order of decreasing frequency value.

12. The handheld electronic device of claim 7 wherein the memory has a number of spell check algorithms stored therein for execution on the handheld electronic device, and wherein the operations further comprise subjecting the modified text entry to at least some of the spell check algorithms to seek proposed spell check interpretations of the text entry.

\* \* \* \* \*

UNITED STATES PATENT AND TRADEMARK OFFICE
CERTIFICATE OF CORRECTION

| | | |
|---|---|---|
| PATENT NO. | : 9,092,418 B2 | Page 1 of 1 |
| APPLICATION NO. | : 11/694384 | |
| DATED | : July 28, 2015 | |
| INVENTOR(S) | : Vadim Fux et al. | |

It is certified that error appears in the above-identified patent and that said Letters Patent is hereby corrected as shown below:

ON THE TITLE PAGE

Item 73 (Assignee), Delete "Limted," and insert -- Limited, --, therefor.

Signed and Sealed this
Twenty-third Day of February, 2016

Michelle K. Lee
*Director of the United States Patent and Trademark Office*